United States Patent [19]

Geddes et al.

[11] Patent Number: 4,458,653
[45] Date of Patent: Jul. 10, 1984

[54] VAPOR FUEL SYSTEM FOR INTERNAL COMBUSTION ENGINES

[76] Inventors: Harold L. Geddes, 3255 SE. Lewis Ct., Troutdale, Oreg. 97060; Dell Ray Beckstead, 3731 NE. Country Club Ave., Gresham, Oreg. 97030

[21] Appl. No.: 268,712

[22] Filed: Jun. 1, 1981

[51] Int. Cl.³ .......................................... F02M 31/00
[52] U.S. Cl. .................................. 123/557; 123/554; 261/145
[58] Field of Search ............. 123/557, 554, 523, 522, 123/524, 558; 261/144, 145, DIG. 83, 150, 157; 48/180 C, 180 H

[56] References Cited

U.S. PATENT DOCUMENTS

| | | |
|---|---|---|
| 420,591 | 2/1890 | Dawson .............................. 123/523 |
| 550,776 | 12/1895 | Bourgeois .......................... 123/522 |
| 1,065,370 | 6/1913 | Johnston . |
| 1,106,881 | 8/1914 | Maruyama ......................... 123/554 |
| 1,259,898 | 3/1918 | Osowski . |
| 1,281,962 | 10/1918 | Holland . |
| 1,292,653 | 1/1919 | Saul .................................... 123/557 |
| 1,322,654 | 11/1919 | Thomas .............................. 261/145 |
| 1,326,000 | 12/1919 | Schmid ............................... 123/554 |
| 1,518,572 | 12/1925 | Croon . |
| 1,530,882 | 3/1925 | Chapin ............................... 123/557 |
| 1,679,229 | 7/1928 | Swartz ................................ 123/522 |
| 1,725,111 | 8/1929 | Sweeny . |
| 1,779,921 | 10/1930 | Sullivan .............................. 123/524 |
| 1,970,010 | 8/1934 | Long . |
| 2,026,798 | 1/1936 | Pogue . |
| 2,218,922 | 10/1940 | Newbery . |
| 2,285,905 | 6/1942 | Cunningham . |
| 2,315,881 | 4/1943 | Thomas . |
| 2,373,032 | 4/1945 | Klein . |
| 2,742,886 | 4/1956 | McPherson ........................ 123/522 |
| 2,797,072 | 6/1957 | Lucas . |
| 2,801,086 | 7/1957 | Fish . |
| 2,882,882 | 4/1959 | Pantano . |
| 2,982,528 | 5/1961 | Shelton . |
| 3,049,850 | 8/1962 | Smith . |
| 3,067,020 | 12/1962 | Holzapfel . |
| 3,072,113 | 1/1963 | Champ . |
| 3,227,427 | 1/1966 | Wells . |
| 3,273,983 | 9/1966 | Minoza . |
| 3,294,381 | 12/1966 | Schwartz . |
| 3,338,223 | 8/1967 | Williams . |
| 3,447,511 | 6/1969 | Beard et al. ....................... 123/557 |
| 3,496,919 | 2/1970 | Gerrard . |
| 3,630,698 | 12/1971 | Baldwin . |
| 3,653,643 | 4/1972 | Tucker . |
| 3,747,901 | 7/1973 | Covergton . |
| 3,752,451 | 8/1973 | Kendig . |
| 3,789,820 | 2/1974 | Douglas . |
| 3,817,233 | 6/1974 | Kihn . |
| 3,851,633 | 12/1974 | Shih . |
| 3,872,849 | 3/1975 | Chester . |
| 3,926,150 | 12/1975 | Laessig . |
| 4,003,356 | 1/1977 | Naylor ............................... 123/557 |
| 4,089,314 | 5/1978 | Bernecker ......................... 123/557 |
| 4,151,821 | 5/1979 | Wichman .......................... 123/557 |
| 4,197,819 | 4/1980 | Harpman .......................... 123/558 |
| 4,216,751 | 8/1980 | Davison et al. . |
| 4,311,128 | 1/1982 | Bernecker ......................... 123/557 |

FOREIGN PATENT DOCUMENTS 7506619 9/1976 France .
289650 10/1931 Italy ................................... 261/144

OTHER PUBLICATIONS

100 Miles Per Gallon, by Donald E. Novak, 5/80.

Primary Examiner—Ronald H. Lazarus
Attorney, Agent, or Firm—Klarquist, Sparkman, Campbell, Leigh & Whinston

[57] ABSTRACT

A vapor fuel system for an internal combustion engine includes two vaporizing units for vaporizing liquid fuel and mixing it with air and a vapor heat exchanger for heating the fuel vapor-air mixture prior to its combustion in the engine. Hot fluid circulating in engine's cooling system flows through a jacket integrally surrounding each of the two vaporizing units and the vapor heat exchanger to provide a source of heat for vaporizing the fuel and heating the fuel vapor-air mixture. A fuel line carrying the liquid fuel to each of the vaporizing units passes through the hot fluid-filled jacket surrounding each of the units, thereby preheating the fuel before it is vaporized. In an alternate embodiment of the invention, two solenoid valves, one along the fuel line leading to each vaporizing unit, act in conjunction with a timing means to alternate periodically activation and deactivation of the vaporizing units.

16 Claims, 3 Drawing Figures

FIG. 1
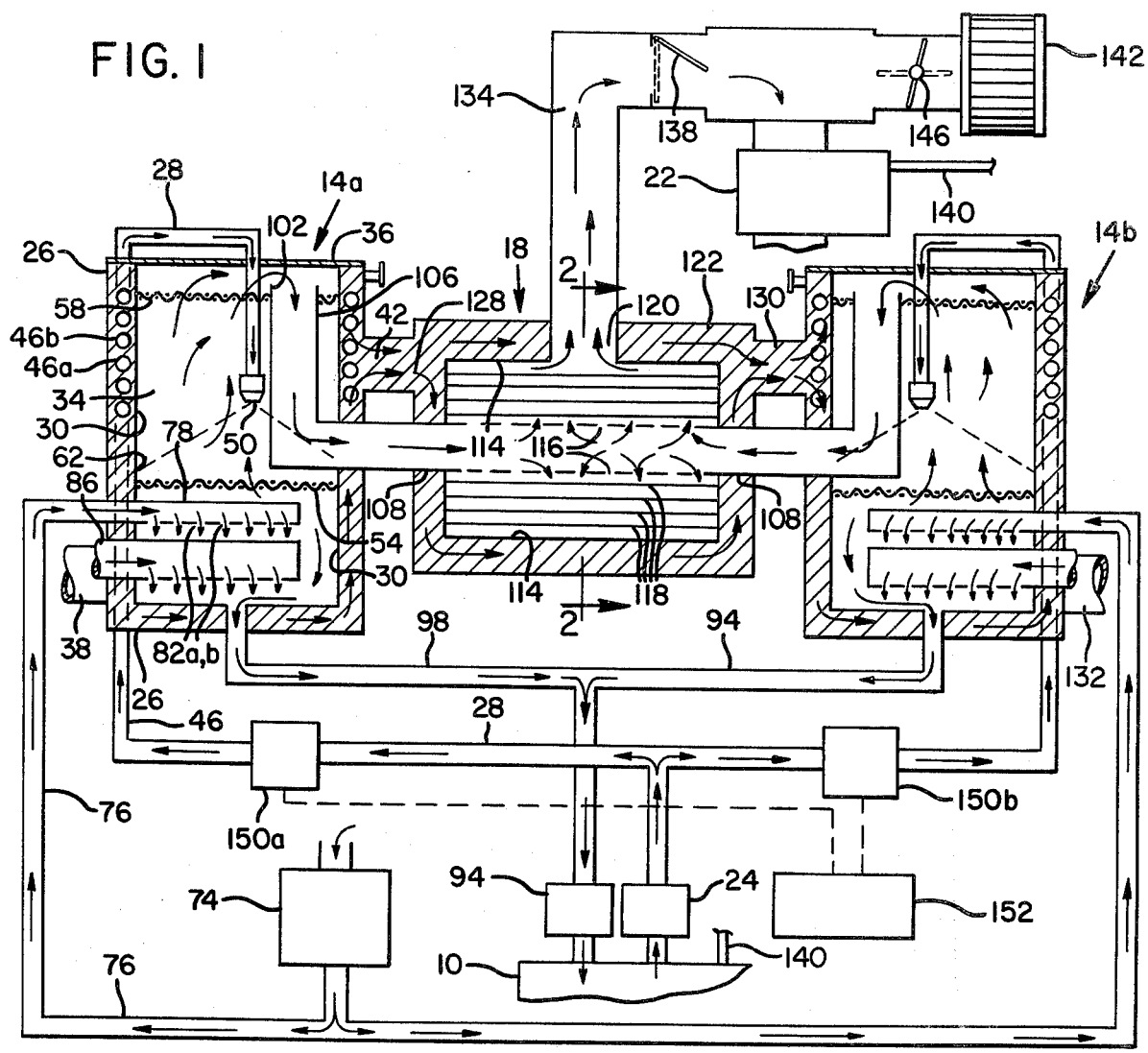
FIG. 2
FIG. 3
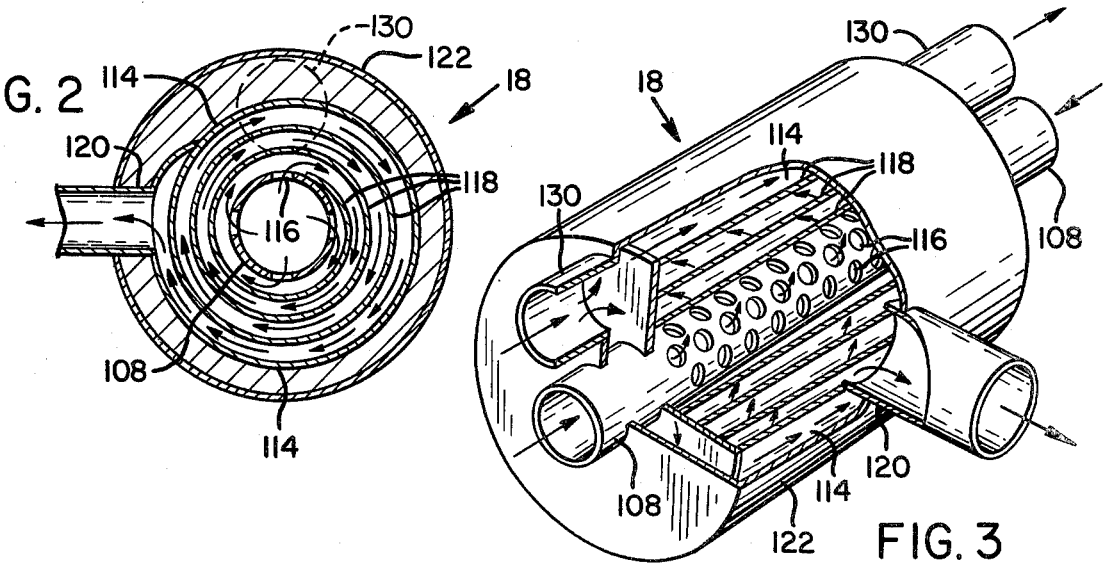

VAPOR FUEL SYSTEM FOR INTERNAL COMBUSTION ENGINES

BACKGROUND OF THE INVENTION

1. Field of the Invention

The present invention relates generally to fuel systems for internal combustion engines and more particularly to a method and apparatus for supplying a vaporized fuel to an internal combustion engine.

2. Description of the Prior Art

Fuel vapor systems which supply fuel vapor to an internal combustion engine are old in the art. Such systems are generally more fuel efficient than conventional liquid fuel systems because they deliver more spaced and uniformly spread fuel molecules to the combustion chamber, thereby promoting a shorter, more complete and hence, more efficient burn of the fuel.

Typical fuel vapor systems are disclosed in a number of U.S. patents, including Davison, et al. U.S. Pat. No. 4,216,751; Champ, U.S. Pat. No. 3,072,113; Cunningham, et al. U.S. Pat. No. 2,285,905; Pantano, U.S. Pat. No. 2,882,882, and Long, U.S. Pat. No. 1,970,010. In each of these systems raw liquid fuel is vaporized in a vaporization chamber heated by exhaust gases discharged from the engine. The fuel vapor is subsequently mixed with most, if not all, of the air needed for combustion and delivered to the engine.

These systems have a number of disadvantages. With the possible exception of Long, each of the above systems delivers liquid fuel at or close to ambient temperature to the vaporization chamber. Since the temperature of the fuel must be increased substantially to its vaporization temperature before vaporization will occur, a considerable amount of heat must be supplied. As a result, a significant percentage of the fuel delivered to the vaporization chamber never vaporizes and must be either returned to the fuel tank or delivered to the engine in liquid form, thereby reducing the fuel efficiency of the system. The Long system apparently preheats the liquid fuel in a primary heater pipe, but the amount of heat supplied appears to be minimal and not enough to alleviate the problem.

In each of the above systems, it is also quite likely that a significant percentage of the fuel vapor cools and condenses as it travels from the vaporization chamber to the engine, since the fuel vapor is at a temperature not much above its condensation temperature and little is done to prevent heat loss, other than perhaps insulating the fuel vapor line or making the line as short as possible. Such condensation also reduces the fuel efficiency of the fuel vapor system. The condensation problem is compounded in Davison, Cunningham and Champ where a full supplement of air at or close to ambient temperature is mixed with the fuel vapor shortly before combustion, thereby cooling and condensing even more of the vapor. The Pantano and Long vapor systems introduce a small quantity of air into the vaporization chamber to mix with the fuel while it is being vaporized. However, this alleviates the problem to only a slight extent since most of the air is mixed with the fuel after it has been vaporized.

Additionally, the exhaust gases used by the above systems to vaporize the fuel dissipate rapidly after the engine is shut off, thereby causing the manifold and exhaust pipes carrying the exhaust gases to cool down rapidly. Thus, once the engine is shut off the above systems are incapable of supplying sufficient heat to vaporize the fuel and start the engine. As a result, a conventional liquid fuel system must be used to start and warm up the engine, even when the engine has been shut off for only a few minutes.

Finally, while vapor systems generally achieve a shorter, more complete and less wasteful burn of the fuel than liquid fuel systems, the fuel-air mixture combusted is inherently leaner. Thus, vapor systems, such as those discussed above, generally cannot generate as much power as liquid systems. The power output of the vapor system can be increased by supplementing the fuel vapor with liquid fuel, but then the overall fuel efficiency is reduced.

Accordingly, there is a need for a fuel vapor system which reduces the amount of unvaporized fuel in the vaporization chamber, reduces the amount of fuel vapor condensation, is capable of starting and running the engine without the help of a supplementary fuel system shortly after the engine is shut off, and produces sufficient vapor to satisfy the power requirements of the engine under most conditions in a fuel efficient manner.

SUMMARY OF THE INVENTION

The present invention solves the foregoing problems and improves prior art fuel vapor systems by providing two selectively operable fuel vaporizing units in parallel fluid communication with a fuel tank and an internal combustion engine. Liquid fuel is pumped from the fuel tank to each vaporizing unit through a fuel line which passes through a fluid-filled jacket surrounding the vaporizing unit and is sprayed into a vaporization chamber of the unit. Hot fluid circulating within a cooling system of the engine flows through each jacket and thoroughly preheats the fuel in the fuel line, thereby increasing the temperature of the fuel significantly and minimizing the amount of fuel which subsequently fails to vaporize. Moreover, the hot fluid retains its capacity to generate heat for quite some time after the engine is shut off, thereby allowing the engine to be started with the fuel vapor system when the engine is still warm.

As the fuel is vaporized within the vaporization chamber it is mixed with a full supplement of air, thereby eliminating the condensation problem caused by adding air after the fuel is vaporized. The fuel vapor-air mixture is heated in a vapor heat exchanger having a baffle for directing the mixture in a generally spiral path within the heat exchanger. Heat is supplied to the heat exchanger by hot fluid flowing through a jacket surrounding the baffle. The heat exchanger serves to not only minimize condensation of the fuel vapor, but to positively increase the temperature of the fuel vapor-air mixture, thereby further increasing the fuel efficiency of the system. The heated mixture is directed through a carburetor to the engine where it is combusted.

In an alternate embodiment of the invention, two solenoid valves are used in conjunction with a timing mechanism to enable the vaporizing units to be activated and deactivated periodically, so as to increase the maximum power output of the engine in a fuel efficient manner.

It is therefore one object of the invention to provide an improved vapor fuel system for an internal combustion engine of simplified, low-cost construction.

Another object of the invention is to provide an improved fuel vapor system, as aforesaid, which can be used in conjunction with a liquid fuel system of the engine.

A further object of the invention is to provide a fuel vapor system, as aforesaid, which can be easily and practically installed so as to convert an internal combustion engine from one which runs primarily on liquid fuel to one which runs primarily on fuel vapor.

An additional object of the invention is to provide a vapor fuel system of compact, simplified construction which can be economically and practically installed and used with conventional motor vehicle engines.

A still further object of the invention is to provide a fuel vapor system in which the liquid fuel is thoroughly preheated prior to its vaporization.

Another object of the invention is to provide a fuel vapor system which increases the fuel efficiency of the engine with which it is used.

A further object of the invention is to provide a fuel vapor system which is adapted to be used with conventional liquid fuel supply systems of internal combustion engines.

Yet another object of the invention is to provide a fuel vapor system in which a substantial amount of air is mixed with the liquid fuel as it is being vaporized.

A further object of the invention is to provide a fuel vapor system which minimizes condensation of the fuel after it has been vaporized.

An additional object of the invention is to provide a fuel vapor system in which means for efficiently heating the fuel vapor-air mixture is provided.

Yet another object of the present invention is to provide a system in which a common heat source is used to preheat and vaporize the fuel and to heat the fuel vapor after it is mixed with air.

An additional object of the invention is to provide a system in which circulating hot fluid from the engine's cooling system is used as a heat source.

Another object of the invention is to provide a system that has two vaporizing units which can be activated selectively and alternated periodically.

Other objects and advantages of the invention will become apparent from the following detailed description and with reference to the accompanying drawings.

BRIEF DESCRIPTION OF THE DRAWING

In the drawings:

FIG. 1 is a generally sectional view of a fuel vapor system in accordance with the present invention.

FIG. 2 is an enlarged cross-sectional view of a vapor heat exchanger taken along line 2—2 of FIG. 1.

FIG. 3 is an enlarged perspective view of the vapor heat exchanger with a portion of its outer surface cut away.

DETAILED DESCRIPTION OF A PREFERRED EMBODIMENT

As shown in FIG. 1, the present invention preheats liquid fuel drawn from a fuel tank 10 and vaporizes the fuel in two fuel vaporizing units 14a and 14b. During vaporization the fuel is mixed with preheated air. The resulting fuel vapor-air mixture from each vaporizing unit is heated in a common vapor heat exchanger 18 and delivered to a carburetor 22 of an internal combustion engine.

A more detailed description of the present invention will be given with reference to the vaporizing unit 14a. It will be understood, however, that the vaporizing unit 14b is a mirror image of its counterpart in both operation and design.

A fuel pump 24, preferably of the fixed-displacement type, pumps liquid fuel from the fuel tank 10 through a hollow, cylindrical jacket 26 via a fuel line 28 to the vaporizing unit 14a, where the fuel is vaporized.

The vaporizing unit has a cylindrical wall 30 that defines a vaporization chamber 34 and is integrally surrounded on all but the top sides by the jacket 26. A removable lid 36 is secured to the vaporizing unit to seal the vaporization chamber.

The jacket is filled with a hot fluid, typically water, from a liquid cooling system of the engine. The hot fluid enters the jacket through an intake port 38, flows through the jacket, and exits the jacket through an outlet port 42, thereby providing the jacket with a continuous influx of hot fluid.

The jacket serves a two-fold purpose. It serves to heat wall 30 and chamber 34, and also to thoroughly preheat the fuel in fuel line 28 as it passes through the jacket. It has been found that if the line 28 within the jacket is coiled around wall 30 several times, such as at 46a and 46b, and is formed from copper tubing, gasoline can be substantially preheated to at least 125° F., a temperature substantially above its ambient temperature in the fuel tank. Such thorough preheating of the fuel greatly minimizes the amount of fuel which fails to vaporize in the vaporization chamber as compared to prior fuel vapor systems.

After the preheated fuel in line 28 leaves the jacket, a nozzle 50 atomizes and sprays the fuel into the chamber 34 and against a portion of wall 30 disposed between two horizontal, vertically-spaced screens, a first lower screen 54 and second upper screen 58.

Because the intake port 38 is located near the bottom of the jacket, the hot fluid entering the jacket heats the lower portion of wall 30 to a slightly higher temperature than the upper portion. Since much of the fuel vaporizes upon striking the wall, it is desirable to spray the fuel against the lowest possible portion of the wall above screen 54, such as at 62. In this regard, it has been found that where the nozzle is centrally located within the chamber, a nozzle having a 70° spray angle works well.

As the fuel is being vaporized within the vaporization chamber, an air pump 74 introduces charged air into a lower portion of the chamber below screen 54 through a charged air line 76. So as to minimize turbulence within the chamber, a series of holes or orifice means along the underside of an end 78 of air line 76, such as at 82a,b, temporarily directs the air in a downward direction away from the main portion of chamber 34 before the air passes through screen 54 and mixes with the vapor. The screen 54 serves as a collection point for unvaporized fuel and to preheat the air before it mixes with the fuel.

By introducing charged air into the vaporization chamber, the fuel vapor is mixed with virtually all the air needed for combustion in the chamber and the air and fuel vapor are able to reach an equilibrium temperature within the chamber that is above the vaporization temperature of the fuel. Hence, it is not necessary to add "cool" air to the fuel vapor in the carburetor, thereby condensing some of the vapor, as is done with prior fuel vapor systems.

Where a conventional smog pump, such as that found on many automobiles, is used as the air pump 74 and the charged air line 76 has a diameter of one half inch, a sufficient amount of air can be supplied to the vaporizing unit for most operating conditions. The amount of air admitted into chamber 34 is determined to a certain extent by the number and size of the holes on end 78. If additional air is required, such as under high power conditions, air at atmospheric pressure can be introduced into the chamber through an air line 86. The amount of atmospheric air introduced into the chamber is controlled by a butterfly valve (not shown) along line 86. As with charged air line 76, such air is introduced into the chamber through a series of holes along the underside of air line 86 so as to minimize turbulence within the chamber. Air line 86 preferably has a diameter of one inch.

Fuel which does not vaporize in the vaporization chamber or which vaporizes and then condenses collects on screens 54 and 58 and drains to the bottom of the chamber where a fuel return pump 94 pumps the excess fuel through a fuel return line 98 back to fuel tank 10.

Normal suction developed by the engine causes the fuel vapor-air mixture to pass through screen 58 and into a vapor intake port 102 which directs the mixture to a fuel vapor line 106 leading to heat exchanger 18. The screen 58 helps prevent raw fuel from entering intake port 102. The position of the intake port such that it opens in a direction generally opposite the direction of spray of nozzle 50 also helps prevent raw fuel from entering the intake port.

The mixture enters the heat exchanger through an intake tube 108 extending axially therethrough and is dispelled through an orifice means into a heating chamber defined by an inner wall 114 of the heat exchanger. As shown in FIG. 3, the orifice means includes a series of uniformly spaced holes, such as at 116. A spiral-shaped baffle 118 within inner wall 114, as shown in FIGS. 2 and 3, directs the mixture in a generally spiral path through the heating chamber from the orifice means to a vapor outlet port 120.

The mixture is heated as it travels through baffle 118 by heat supplied by a hollow, fluid-filled, cylindrical heat-exchanger jacket 122 which integrally surrounds wall 114 on all sides. Hot fluid exiting the outlet port 42 of jacket 26 enters the heat exchanger jacket through a first port 128, flows through the heat exchanger jacket and exits the jacket at a second port 130. Heat is transferred from the hot fluid to wall 114 and baffle 118, both of which are preferably made of copper sheet, thereby heating the heating chamber and the fuel vapor-air mixture as it passes therethrough. The heat supplied to the mixture serves not only to minimize condensation of the fuel vapor prior to its delivery to the engine, but also to positively increase the temperature of the mixture significantly to further increase the fuel efficiency of the system. When the fuel used is gasoline, it has been found that the heat exchanger 18 heats the fuel vapor-air mixture to a temperature of at least 145° F.

The hot fluid exits the heat exchanger through the second port 130 and enters the jacket of second vaporizing unit 14b, where it preheats and vaporizes the fuel supplied thereto. The fluid then exits the jacket through an exit port 132, which is in fluid communication with a means for cooling and recirculating the fluid, such as a radiator and pump commonly associated with most automobile engines.

The vapor outlet port 120 directs the heated mixture through jacket 122 and to a line 134 which delivers the mixture to carburetor 22. However, before the mixture is delivered to the carburetor, it passes through a one-way check valve 138 which acts to prevent any upstream pressure surge or flow along line 134, such as might be caused by a backfire of carburetor 22.

While the present invention can be used with many different types of internal combustion engines, it is particularly adapted to be used with engines having a conventional fuel supply system, such as automobile engines. The rudiments of a conventional fuel system are shown in FIG. 1. The conventional fuel system includes a fuel line 140 in fluid communication with fuel tank 10 and carburetor 22, a fuel pump (not shown), an air filter 142 and a butterfly valve 146. When the conventional system is active, the vapor system is bypassed by delivering fuel directly from the fuel tank to the carburetor through the line 140. Air is drawn through an air filter 142 and a butterfly valve 146 and mixed with the fuel in the carburetor in a conventional manner. While pumps 24 and 94 are inactive, pump 74 remains active and provides a small amount of heated air to the carburetor through line 134 and valve 138. The vapor system is activated by closing a solenoid valve along line 140, thereby stopping the flow of liquid fuel to the carburetor, and activating pumps 24 and 94. The valve 138 will automatically open further in response to increased pressure in line 134.

In operation, the conventional fuel system is used to initially start the engine and heat the engine's coolant fluid to a temperature sufficient to vaporize the fuel. This normally takes about five minutes, after which line 140 is closed and the vapor system activated.

However, the conventional fuel system is not needed to start the engine where the engine has been running and then shut off for a short period of time, since the hot fluid in jacket 26 will still be hot enough to vaporize the fuel. Hence, under these conditions, the fuel vapor system can be used to start the engine, unlike prior vapor systems. Moreover, it will be understood that the present invention can be used as the sole fuel supply system as long as some other means of initially heating the engine's cooling fluid to a temperature sufficient to vaporize the fuel is provided.

While the present invention will run in a satisfactory manner with one vaporizing unit, it is desirable to use two vaporizing units, such as shown in FIG. 1, which can each be activated and deactivated selectively. The units are activated and deactivated selectively by opening and closing two solenoid valves 150a and 150b, one each disposed along the fuel line 28 leading to vaporizing units 14a and 14b. Under normal conditions, one unit is active and the other dormant. If more power from the engine is required, the second unit can be activated temorarily to supply additional fuel vapor to the engine. While more fuel is consumed when both units are activated, it is consumed in a fuel efficient manner and without resort to the use of liquid fuel. It will be understood that more than two vaporizing units can be used with the present invention, although in such an embodiment it may be impractical to use a common vapor heat exchanger.

With regard to the vaporizing units, it has been found that a nozzle 50 having a flow rate of 1.5 gallons per hour will adequately atomize the fuel when it is sprayed into the chamber 34. Further, it is necessary that the pump 24 be of a high pressure type capable of developing 30-60 psi in order to force the fuel through the nozzle.

In an alternate embodiment of the invention, a timing means 152 is used to open and close the solenoid valves 150a and 150b periodically so that one vaporizing unit is active while the other is dormant and vice versa. In this way, the power output of the engine is increased in a fuel efficient manner because the dormant vaporizing unit continues to provide residual fuel vapor left over from when it was active to the engine for a period of time after it becomes dormant. When the residual fuel vapor in the dormant vaporizing unit begins to dissipate, typically after 15-20 seconds, the timing means activates the dormant vaporizing unit and deactivates the active vaporizing unit. Any conventional timing means for periodically opening and closing valves 150a and 150b, such as a timer having a free-running, variable frequency multivibrator circuit which generates impulses to trigger the valves, can be used.

While the present invention is particularly adapted to be used with an internal combustion engine having a liquid cooling system, such a cooling system is not required. Alternatively, the present invention can be used with air-cooled engines simply by using the hot exhaust gases produced by the engine as a heat source to preheat and vaporize the liquid fuel and to heat the fuel vapor-air mixture.

Having illustrated and described the principles of our invention by what is presently a preferred embodiment and several suggested alternatives, it should be apparent to those persons skilled in the art that such embodiments may be modified in arrangement and detailed without departing from such principles. We claim as our invention all such modifications as come within the true spirit and scope of the invention as defined by the following claims.

We claim:

1. In a fuel vaporizing system for supplying a vaporized fuel to an internal combustion engine in which the system is provided with a source of liquid fuel and passage means for conveying liquid fuel from said source to a vaporizing means for vaporizing the liquid fuel, a vaporizing means comprising:
   wall means defining a vaporization chamber,
   nozzle means at the downstream end of said passage means for spraying the liquid fuel in a generally downward direction against sidewall portions of said wall means within said chamber; and
   fluid-filled jacket means surrounding said vaporization chamber to heat said chamber and vaporize liquid fuel introduced into said chamber by said nozzle means;
   said passage means following a tortuous path through said jacket means to preheat the liquid fuel before it enters said chamber.

2. A vaporizing means according to claim 1 wherein said nozzle means is positioned within said chamber so as to spray said liquid fuel against sidewall portions of said wall means nearer the bottom than top of said chamber.

3. A vaporizing means according to claim 2 including a vapor intake port within said vaporization chamber for receiving the vaporized fuel and directing it toward said engine, said vapor intake port being disposed nearer the top than bottom of said vaporization chamber and opening generally away from the central portion of said vaporization chamber.

4. A vaporizing means according to claim 3 including two horizontal, vertically-spaced liquid fuel-collecting screens within said vaporization chamber, one of said screens being disposed below said nozzle means and the other above said nozzle means and below said intake port.

5. A vaporizing means according to claim 3 including fuel return passage means in fluid communication with said chamber for draining liquid fuel from the bottom of said chamber.

6. A vaporizing means according to claim 1 including an air supply means in fluid communication with said vaporizing means and operable to introduce air into said vaporizing means to mix with fuel therein during the vaporization of the liquid fuel.

7. A vaporizing means according to claim 1 wherein an engine coolant fluid is passed along an outside surface of said wall means to heat said chamber.

8. A fuel supply system for an internal combustion engine in which the system is provided with a source of liquid fuel, the system comprising:
   a fuel vaporizing means including an enclosed vaporizing chamber and chamber heating means for heating said vaporizing chamber to facilitate the vaporization of fuel introduced into said chamber from a first passage means;
   a liquid fuel heating means for preheating the liquid fuel in said first passage means before it is introduced into said vaporizing chamber,
   said first passage means being in fluid communication with said source and vaporizing chamber and including a passage portion for conveying liquid fuel along a tortuous path through said liquid fuel heating means, said first passage means terminating at a fuel spray nozzle means within said chamber;
   air supply means in fluid communication with said chamber and operable to introduce air into said chamber to mix with fuel therein as such fuel is being vaporized;
   second passage means in fluid communication with said chamber for conveying a fuel vapor-air mixture from said chamber toward said engine, and
   vapor heating means for heating said fuel vapor-air mixture downstream of said chamber, said second passage means passing through said vapor heating means;
   said chamber heating means and said liquid fuel heating means comprising a common heating means;
   said air supply means including pump means for introducing charged air into said chamber and second air supply means for selectively introducing additional quantities of air at atmospheric pressure into said chamber;
   said air supply means including orifice means within said vaporizing means for temporarily directing said charged air and air at atmospheric pressure away from the central portion of said chamber as it enters said chamber, said orifice means being disposed nearer the bottom than top of said chamber.

9. A method of fueling an internal combustion engine with a fuel vapor-air mixture comprising:
   preheating a liquid fuel,
   vaporizing the preheated liquid fuel,
   mixing the fuel vapor with air,
   adding heat to the vapor-air mixture,
   the preheated liquid fuel being vaporized by atomizing the preheated liquid fuel in the presence of air within a chamber heated to a temperature sufficient to vaporize said liquid fuel such that the fuel vapor and air mix within said chamber;
   the preheated liquid fuel being vaporized and mixed with air by spraying the liquid fuel into the chamber in a generally downward direction, introducing air into the chamber, and screening the air in the chamber to preheat the same before it mixes with the fuel vapor, draining excess liquid fuel from the bottom of the chamber, drawing off a fuel vapor-air mixture from the upper end of said chamber after screening the mixture to collect unvaporized fuel, and delivering the fuel vapor-air mixture to the internal combustion engine.

10. The method of claim 9 wherein heat is added to the vapor-air mixture by passing the mixture in a generally spiral path through a heat exchanger.

11. The method according to claim 9 wherein the heat required to heat the fuel medium is supplied by passing the fuel medium in a heat exchange relationship to a hot coolant fluid from the engine's coolant system.

12. The method of claim 9 wherein the liquid fuel is preheated to a temperature of at least about 125° F.

13. The method of claim 9 wherein the chamber is heated to a temperature of at least 125° F.

14. The method of claim 9 wherein the vapor-air mixture is heated to a temperature of at least 145° F. before delivering it to the engine.

15. A fuel supply system for an internal combustion engine in which the system is provided with a source of liquid fuel, the system comprising:

a fuel vaporizing means including an enclosed vaporizing chamber and chamber heating means for heating said vaporizing chamber to facilitate the vaporization of fuel introduced into said chamber from a first passage means;

a liquid fuel heating means for preheating the liquid fuel in said first passage means before it is introduced into said vaporizing chamber, said first passage means being in fluid communication with said source and vaporizing chamber and including a passage portion for conveying liquid fuel along a tortuous path through said liquid fuel heating means, said first passage means terminating at a fuel spray nozzle means within said chamber;

air supply means in fluid communication with said chamber and operable to introduce air into said chamber to mix with fuel therein as such fuel is being vaporized;

second passage means in fluid communication with said chamber for conveying a fuel vapor-air mixture from said chamber toward said engine, and vapor heating means for heating said fuel vapor-air mixture downstream of said chamber, said second passage means passing through said vapor heating means;

said chamber heating means and said liquid fuel heating means comprising a common heating means;

said chamber heating means and liquid fuel heating means comprising a first jacket means in surrounding relationship to the vaporizing chamber, said passage portion forming a coil within said first jacket means to cause the fuel to follow a generally helical path through said first jacket means.

16. A fuel supply system according to claim 15 wherein said second passage means includes means within a second jacket means for causing the fuel vapor-air mixture to follow a generally spiral path through said second jacket means.

* * * * *